US010597172B2

(12) United States Patent
Zhu et al.

(10) Patent No.: US 10,597,172 B2
(45) Date of Patent: Mar. 24, 2020

(54) MAGNETIC-FLUID MOMENTUM SPHERE

(71) Applicants: TSINGHUA UNIVERSITY, Beijing (CN); BEIJING U-PRECISION TECH CO., LTD., Beijing (CN)

(72) Inventors: Yu Zhu, Beijing (CN); Anlin Chen, Beijing (CN); Ming Zhang, Beijing (CN); Kaiming Yang, Beijing (CN); Rong Cheng, Beijing (CN)

(73) Assignees: TSINGHUA UNIVERSITY, Beijing (CN); BEIJING U-PRECISION TECH CO., LTD., Beijing (CN)

( * ) Notice: Subject to any disclaimer, the term of this patent is extended or adjusted under 35 U.S.C. 154(b) by 71 days.

(21) Appl. No.: 15/760,540

(22) PCT Filed: Jul. 18, 2016

(86) PCT No.: PCT/CN2016/090264
§ 371 (c)(1),
(2) Date: Mar. 15, 2018

(87) PCT Pub. No.: WO2017/045475
PCT Pub. Date: Mar. 23, 2017

(65) Prior Publication Data
US 2018/0273212 A1    Sep. 27, 2018

(30) Foreign Application Priority Data
Sep. 15, 2015   (CN) .......................... 2015 1 0587640

(51) Int. Cl.
*G01C 19/30*   (2006.01)
*G01C 19/46*   (2006.01)
(Continued)

(52) U.S. Cl.
CPC ............. *B64G 1/285* (2013.01); *G01C 19/24* (2013.01); *H02K 5/1282* (2013.01); *H02K 16/00* (2013.01);
(Continued)

(58) Field of Classification Search
CPC .............................. B64G 1/285; G01C 19/24
See application file for complete search history.

(56) References Cited

U.S. PATENT DOCUMENTS 4,441,375 A * 4/1984 Minohara .............. G01C 19/20
33/327
4,570,507 A * 2/1986 Hunter ................... G01C 19/20
74/5.1
(Continued)

FOREIGN PATENT DOCUMENTS

CN    203180806 U    9/2013
CN    104467357 A    3/2015
(Continued)

OTHER PUBLICATIONS

International Search Report for PCT/CN2016/090264 filed on Jul. 18, 2016.

*Primary Examiner* — Jake Cook

(57) ABSTRACT

Disclosed is a magnetic-fluid momentum sphere, which is used for satellite attitude adjustment. The magnetic-fluid momentum sphere comprises stators and a spherical shell. The stators are classified into three groups, axes of the three groups of stators are orthogonal to each other, each group comprises two stators arranged symmetrically about the center of the spherical shell, and the inner surfaces of the stators are spherical surfaces. The spherical shell is formed by combining two hemispherical shells, the material of the spherical shell is a non-ferromagnetic material, the inner surfaces of the stators closely adhere to the outer surface of the spherical shell, there is no relative movement between (Continued)

the spherical shell and the inner surfaces of the stators, and the spherical shell is filled with magnetic fluid. The magnetic-fluid momentum sphere achieves a small size and mass, low costs, and small coupling among the axes.

5 Claims, 3 Drawing Sheets

(51) Int. Cl.
      *B64G 1/28*        (2006.01)
      *H02K 16/04*      (2006.01)
      *H02K 41/03*      (2006.01)
      *H02K 16/00*      (2006.01)
      *G01C 19/24*      (2006.01)
      *H02K 5/128*      (2006.01)

(52) U.S. Cl.
    CPC ........... *H02K 16/04* (2013.01); *H02K 41/031* (2013.01); *H02K 2201/18* (2013.01)

(56) References Cited

U.S. PATENT DOCUMENTS

| | | | |
|---|---|---|---|
| 4,961,352 A * | 10/1990 | Downer | F16C 32/0438 |
| | | | 310/90.5 |
| 9,543,818 B2 * | 1/2017 | Detloff | H02K 44/00 |
| 2003/0215343 A1 | 11/2003 | Laing et al. | |

FOREIGN PATENT DOCUMENTS

| | | |
|---|---|---|
| CN | 104483972 A | 4/2015 |
| CN | 104753273 A | 7/2015 |
| CN | 104853273 A | 8/2015 |
| CN | 105141089 A | 12/2015 |
| CN | 204967571 U | 1/2016 |
| JP | 2004-45362 A | 2/2004 |

* cited by examiner

MAGNETIC-FLUID MOMENTUM SPHERE

CROSS-REFERENCE TO RELATED APPLICATIONS

The present application is a National Stage of International Patent Application No. PCT/CN2016/090264 filed on Jul. 18, 2016, which claims priority to Chinese Patent Application No. 201510587640.1 filed on Sep. 15, 2015, the disclosures of which are hereby incorporated in their entirety by reference.

TECHNICAL FIELD

The present invention relates to a magnetic-fluid momentum sphere, which is used as an actuator for satellite attitude adjustment, and belongs to the aerospace technical field.

BACKGROUND ART

Satellites in orbit perform specific tasks for detecting, developing, and utilizing space, these kinds of tasks require attitude stabilization or attitude maneuvering for satellite attitude control. Actuator mechanism for satellite attitude stabilization and attitude maneuvering have been a focus of attention as a important technology for satellite attitude control, and the momentum wheel based on the principle of conservation of momentum moment (angular momentum) is a commonly used technical solution. The existing developed technology is the mechanical ball bearing momentum wheel, the mechanical ball bearing momentum wheel has large mechanical friction loss, large volume and mass, complex structure and high cost. In addition, one satellite is required to carry multiple momentum wheels to realize tri-axial attitude adjustment for the satellite, and the couplings among multiple momentum wheels are larger, whereby further reduces the effective load of the satellite.

SUMMARY

A purpose of the present invention is to provide a magnetic-fluid momentum sphere which is capable of providing a satellite with a momentum moment about any axis by the rotation of the magnetic-fluid so as to realize a tri-axial attitude adjustment of the satellite.

The technical solutions of the present invention are as follows:

A magnetic-fluid momentum sphere comprising stators and a spherical shell, wherein the stators are divided into three groups, axes of the three groups of stators are orthogonal to each other, each group of stators comprises two stators which are arranged symmetrically with respect to the center of the spherical shell, and inner surfaces of the stators are spherical surfaces; the spherical shell is formed by coupling two hemispherical shells together, and the spherical shell is made of a non-ferromagnetic material, wherein the inner surfaces of the stators are closely attached to an outer surface of the spherical shell, there is no relative movement between the spherical shell and the inner surfaces of the stators, and the spherical shell is filled with magnetic fluid.

Each stator comprises a stator motor and a magnetic wheel, and the magnetic wheel is mounted on the stator motor and is driven by the stator motor to rotate; an upper surface of the stator motor is the inner surface of the stator, and the inner surface of the stator is closely attached to the outer surface of the spherical shell; an upper surface of the magnetic wheel is a spherical surface which is concentric with the upper surface of the stator motor, and a spherical radius of the upper surface of the magnetic wheel is larger than a spherical radius of the upper surface of the stator motor, and there is an air gap between the magnetic wheel and the spherical shell, and the magnetic wheel is a NS permanent magnet array magnetic wheel or a Halbach permanent magnet array magnetic wheel.

Each stator comprises a stator core and a coil array; an upper surface of the stator core is the inner surface of the stator, and the upper surface of the stator core is closely attached to the outer surface of the spherical shell, and the stator core is provided with through slots along radial directions, and the through slots are evenly distributed along a circumference of the stator core.

The coil array adopts a stator winding of a disc-type motor, two effective sides of each coil in the coil array are respectively disposed in two of the through slots of the stator core, and the number of coils of each stator is half of the number of the through slots or equal to the number of the through slots.

An inner spherical shell made of a ferromagnetic material is provided in the spherical shell, and there is a gap between an outer surface of the inner spherical shell and an inner surface of the spherical shell, and the gap is filled with the magnetic fluid.

Compared with the technical solutions of the prior art, the present invention has the following advantages and prominent technical effects: in the present invention, the rotation of the magnetic-fluid is adopted for satellite attitude adjustment, and the present invention achieves the advantages of small size, low mass, low cost, and small coupling between respective axes. In the present invention, the spherical shell of the magnetic-fluid momentum sphere does not rotate, the manufacture is simple and the structure is compact; the friction between the magnetic-fluid and the spherical shell is low, the loss is low, and the reliability and the efficiency are high.

Figure 1:
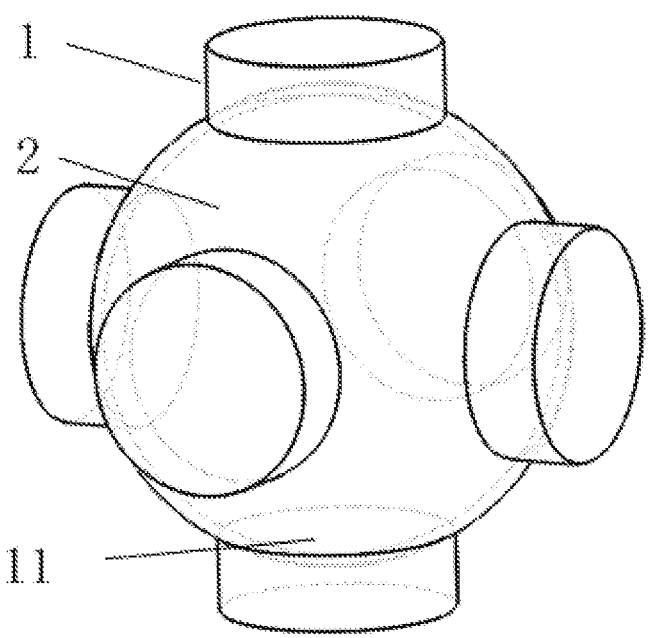
FIG. 1 is a schematic view showing the overall structure of an embodiment of a magnetic-fluid momentum sphere according to the present invention.

Reference Numerals: 1-stator; 2-spherical shell; 3-hemispherical shell; 4-stator core; 5-coil array; 6-coil; 7-effective side of the coil; 8-through slot; 9-magnetic wheel; 10-stator motor; 11-inner surface of the stator; 12-inner spherical shell.

DETAILED DESCRIPTION OF EMBODIMENTS

The embodiments of the present invention are further described in detail below with reference to the accompanying drawings.

FIG. 1 is a schematic view showing the overall structure of an embodiment of a magnetic-fluid momentum sphere according to the present invention. The magnetic-fluid momentum sphere comprises a spherical shell 2 and stators 1, and the stators are divided into three groups, axes of the three groups of stators are orthogonal to each other, each group comprises two stators, two stators in each group are arranged symmetrically about the center of the spherical shell 2.

Figure 2:
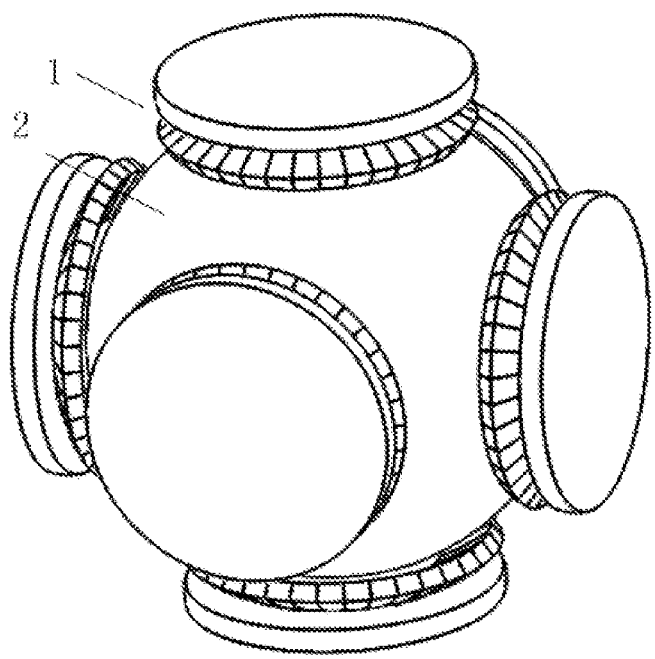
FIG. 2 is a schematic view of an embodiment of a magnetic-fluid momentum sphere driven by permanent magnet according to the present invention.
Figure 3:
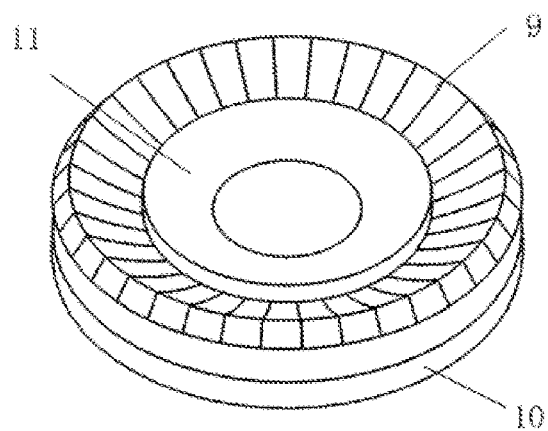
FIG. 3 is a structural schematic view of a stator in an embodiment of a magnetic-fluid momentum sphere driven by permanent magnet according to the present invention.

FIG. 2 is a schematic view of an embodiment of a magnetic-fluid momentum sphere driven by permanent magnet according to the present invention. FIG. 3 is a structural schematic view of a stator in an embodiment of a magnetic-fluid momentum sphere driven by permanent magnet according to the present invention. Each stator in this embodiment comprises a stator motor 10 and a magnetic wheel 9, and the magnetic wheel 9 is mounted on the stator motor 10 and is driven by the stator motor 10 to rotate; the upper surfaces of the stator motors 10 are the inner surfaces 11 of the stators, and the inner surfaces 11 of the stators are spherical surfaces and closely attached to the outer surface of the spherical shell 2, there is no relative movement between the spherical shell 2 and the inner surfaces 11 of the stators. The upper surface of the magnetic wheel 9 is a spherical surface which is concentric with the upper surface of the stator motor 10, and the spherical radius thereof is greater than the spherical radius of the upper surface of the stator motor, and an air gap is formed between the magnetic wheel 9 and the spherical shell 2, and the magnetic wheel 9 is a NS permanent magnet array magnetic wheel or a Halbach permanent magnet array magnetic wheel. In the embodiment of the magnetic-fluid momentum sphere driven by the permanent magnet, the stator motor 10 of each stator 1 drives the magnetic wheel 9 to rotate so as to form a magnetic field rotating about the axis of this stator in the interior cavity of the spherical shell 2.

Figure 4:
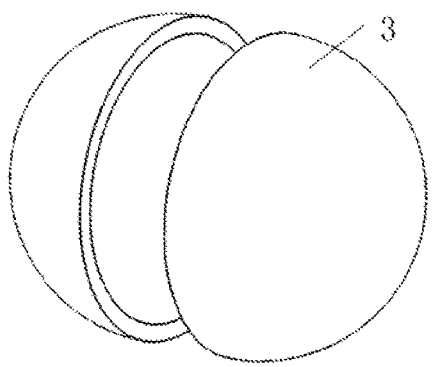
FIG. 4 is a structural schematic view of the spherical shell in the embodiment.

FIG. 4 is a structural schematic view of the spherical shell in the embodiment. The spherical shell is formed by combining two hemispherical shells 3, the material of the spherical shell is a non-ferromagnetic material, and the spherical shell 2 is filled with the magnetic fluid.

Figure 5:
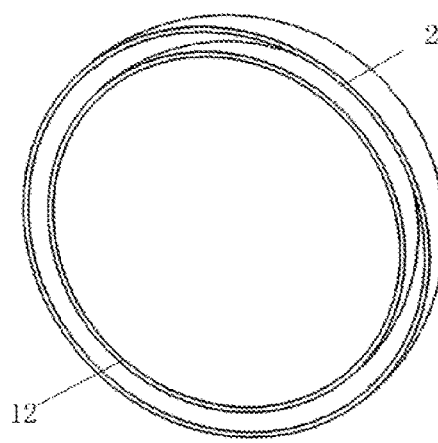
FIG. 5 is a structural schematic view of the inner spherical shell in the embodiment.

FIG. 5 is a structural schematic view of the inner spherical shell in the embodiment. An inner spherical shell 12 made of a ferromagnetic material is embedded in the spherical shell 2, and there is a gap between the outer surface of the inner spherical shell 12 and the inner surface of the spherical shell 2, and the gap is filled with the magnetic-fluid. The ferromagnetic inner spherical shell 12 urges the magnetic circuit to close and increases the magnetic induction intensity in the gap, which is favorable for increasing the torque subjected by the magnetic fluid.

Figure 6:
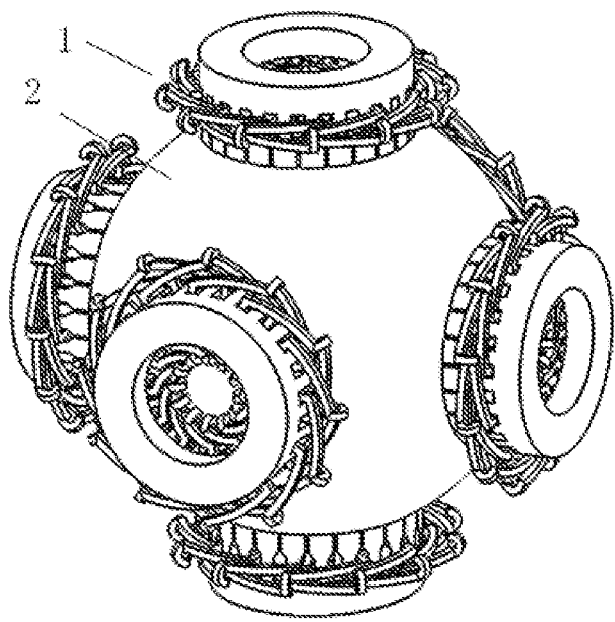
FIG. 6 is a schematic view of an embodiment of a magnetic-fluid momentum sphere driven by electromagnetic force according to the present invention.
Figure 7:
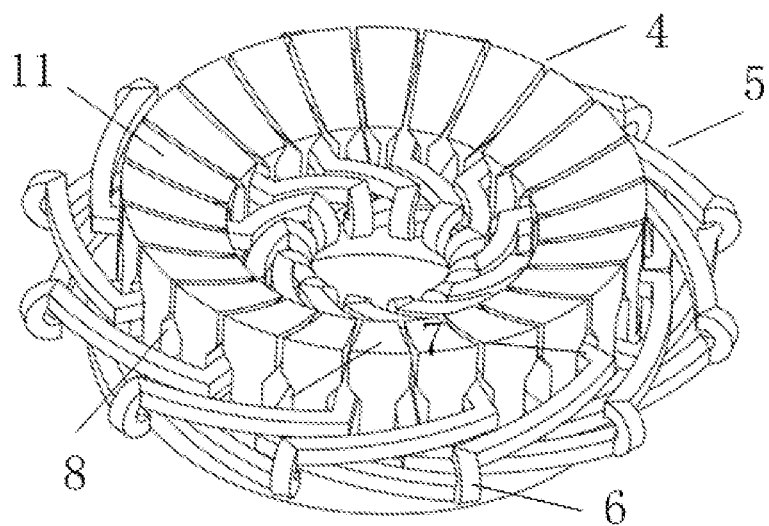
FIG. 7 is a structural schematic view of a stator in an embodiment of a magnetic-fluid momentum sphere driven by electromagnetic force according to the present invention.

FIG. 6 is a schematic view of another embodiment of a magnetic-fluid momentum sphere driven by electromagnetic force according to the present invention. The difference between the magnetic-fluid momentum sphere driven by electromagnetic force and the magnetic-fluid momentum sphere driven by permanent magnet is in the difference of the stator. FIG. 7 is a structural schematic view of a stator in an embodiment of a magnetic-fluid momentum sphere driven by electromagnetic force according to the present invention. Each stator 1 comprises a stator core 4 and a coil array 5. In this embodiment, the upper surface of the stator core 4 is the inner surface 11 of the stator, and the inner surfaces 11 of the stators are spherical surfaces, and the inner surfaces 11 of the stators are closely attached to the outer surface of the spherical shell 2, there is no relative movement between the spherical shell 2 and the inner surfaces 11 of the stators. The stator core 4 is provided with through slots 8 along the radial directions, and the through slots 8 are evenly distributed on the circumference of the stator core 4. In this embodiment, there are total of 24 through slots; the coil array 5 can adopt a disc-type motor stator winding, and the number of coils 6 of each stator 1 is half of the number of through slots 8 or equal to the number of through slots 8. In the case where a double layer winding is adopted, the number of the coils 6 is equal to the number of the through slots 8. In the case where a single layer winding is adopted, the number of the coils 6 is half of the number of the through slots 8. In this embodiment, a single layer winding is adopted, thus there are total of 12 coils, and the coils 6 are evenly arranged on the circumference. Each of the coils 6 comprises two effective sides 7, and the two effective sides 7 are respectively disposed within two through slots, in this embodiment, the two through slots are spaced by four through slots in the middle, and two effective sides 7 are arranged such that one of the effective sides is located at a higher position and the other of the effective sides is located at a lower position in the axial direction of the stator, the effective side located at the higher position is placed in the upper half portion of one of the through slots, and the effective side located at the lower position is placed in the lower half portion of the other of the through slots, and two adjacent coils are spaced by one through slot. In this embodiment, the alternating currents in the two adjacent coils 6 within the coil array 5 of each stator 1 have a difference of the same electrical angle $\pi/3$ so as to form a magnetic field rotating about the axis of the stator in the interior cavity of the spherical shell.

When a certain stator 1 is in operation, that is to say, the coil array 5 in the magnetic-fluid momentum sphere driven by electromagnetic force is energized with current or the stator motor 10 in the magnetic-fluid momentum sphere driven by permanent magnet drives the magnet wheel 9 to rotate, a magnetic field rotating about the axis of the stator is generated in the interior cavity of the spherical shell 2, and the magnetic fluid is subjected to a force in the rotating magnetic field, and rotates around the axis of the stator while closely clinging to the inner surface of the spherical shell 2 under the action of the force, to generate a momentum moment around the axis of the stator.

When two or more stators are in operation, each of the stator 1 forms a magnetic field rotating about the axis of the stator in the interior cavity of the spherical shell 2, and the magnetic fluid is subjected to forces in the rotating magnetic fields and rotates while closely clinging to the inner surface of the spherical shell under the action of the force, thereby can provide the satellite with a momentum moment rotating about any axis to realize the three-axis attitude adjustment for the satellite.

The invention claimed is:

1. A magnetic-fluid momentum sphere, which is used for satellite attitude adjustment, comprising stators (1) and a spherical shell (2), wherein the stators are divided into three groups, axes of the three groups of stators are orthogonal to each other, each group of stators comprises two stators which are arranged symmetrically with respect to a center of the spherical shell, and inner surfaces (11) of the stators are spherical surfaces; and the spherical shell is formed by coupling two hemispherical shells (3) together, and the spherical shell is made of a non-ferromagnetic material, wherein:

the inner surfaces of the stators abut against an outer surface of the spherical shell, there is no relative movement between the spherical shell and the inner surfaces of the stators, and the spherical shell is filled with magnetic fluid.

2. The magnetic-fluid momentum sphere according to claim 1, wherein:
each stator comprises a stator motor (10) and a magnetic wheel (9), and the magnetic wheel is mounted on the stator motor and is driven by the stator motor to rotate; an upper surface of the stator motor is the inner surface of the stator, and the inner surface of the stator abuts against the outer surface of the spherical shell; and an upper surface of the magnetic wheel is a spherical surface which is concentric with the upper surface of the stator motor, a spherical radius of the upper surface of the magnetic wheel is larger than a spherical radius of the upper surface of the stator motor, there is an air gap between the magnetic wheel and the spherical shell, and the magnetic wheel is a NS permanent magnet array magnetic wheel or a Halbach permanent magnet array magnetic wheel.

3. The magnetic-fluid momentum sphere according to claim 1, wherein:
each stator comprises a stator core (4) and a coil array (5); and an upper surface of the stator core is the inner surface of the stator, the upper surface of the stator core abuts against the outer surface of the spherical shell, the stator core is provided with through slots (8) along radial directions, and the through slots are evenly distributed along a circumference of the stator core.

4. The magnetic-fluid momentum sphere according to claim 3, wherein:
the coil array adopts a stator winding of a disc-type motor, two effective sides (7) of each coil (6) in the coil array are respectively disposed in two of the through slots of the stator core, and the number of coils of each stator is half of the number of the through slots or equal to the number of the through slots.

5. The magnetic-fluid momentum sphere according to claim 1, wherein:
an inner spherical shell (12) made of a ferromagnetic material is provided in the spherical shell, there is a gap between an outer surface of the inner spherical shell and an inner surface of the spherical shell, and the gap is filled with the magnetic fluid.

* * * * *